3,386,980
POLYMERIZATION OF VINYL ALKYL ETHERS WITH METAL OXIDE-SULFURIC ACID COMPLEX CATALYSTS
Joginder Lal and James E. McGrath, Cuyahoga Falls, Ohio, assignors to The Goodyear Tire & Rubber Company, Akron, Ohio, a corporation of Ohio
No Drawing. Filed May 4, 1964, Ser. No. 364,753
16 Claims. (Cl. 260—91.1)

This invention relates to a novel process for producing high molecular weight poly (vinyl alkyl ethers). More particularly, it relates to new catalysts which may be employed to produce poly (vinyl alkyl ethers).

It is known that certain types of vinyl alkyl ethers may be polymerized by employing catalyst complexes formed by reacting aluminum sulfate or ferric sulfate with concentrated sulfuric acid. It is also known that complexes formed by the reaction of concentrated sulfuric acid and trialkylaluminum or aluminum alkoxide are catalysts for vinyl alkyl ethers. It is further understood by those skilled in the art that the combination of either the trialkylaluminum or aluminum alkoxide with the above designated metal sulfates may also be employed as a catalyst.

Because of the usefulness of the high molecular weight vinyl alkyl ether polymers as adhesives, coatings, and the like, there is a desire to find additional, readily available, inexpensive materials which will function as catalysts to produce these useful end products.

A principal objective of this invention, therefore, is to provide a novel method to polymerize vinyl alkyl ethers to form high molecular weight materials. An additional objective is to discover a method to polymerize vinyl alkyl ethers, which may be achieved with inexpensive, readily available commercial materials.

It has now been discovered that vinyl alkyl ethers may be polymerized to high molecular weight materials in the presence of catalysts formed by the reaction of concentrated sulfuric acid and an oxide of a polyvalent metal which is a member of the group consisting of the polyvalent metals of group IIIa, IVb, Vb, VIb, VIIb and VII (Periodic Chart of the Elements), as disclosed on page 448 and 449 of the "Handbook of Chemistry and Physics," 40th edition, published by The Chemical Rubber Publishing Company, Cleveland, Ohio.

The polyvalent metals of group IIIa include aluminum, gallium, indium, thallium; the metals of group IVb include titanium, zirconium, hafnium; the metals of group Vb include vanadium, niobium, tantalum; the metals of group VIb include chromium, molybdenum, tungsten; the metals of group VIIb include manganese, rhenium; the metals of group VIII include iron, cobalt, nickel, ruthenium, rhodium, palladium, osmium, iridium, platinum. Repersentative examples of the oxides of the above metals are aluminum oxide $Al_2O_3$, gallic oxide $Ga_2O_3$, indium oxide $In_2O_3$, thallic oxide $Tl_2O_3$, titanium oxides TiO, $TiO_2$, $Ti_2O_3$, zirconium dioxide $ZrO_2$, hafnium dioxide $HfO_2$, vanadium oxides VO, $V_2O_3$, $VO_2$, $V_2O_5$, niobium pentoxide $Nb_2O_5$, tantalum pentoxide $Ta_2O_5$, chromic oxide $Cr_2O_3$, molybdenum oxides $MoO_2$, $MoO_3$, tungsten oxides $WO_2$, $WO_3$, manganese oxides MnO, $MnO_2$, $Mn_3O_4$, rhenium oxides $Re_2O_3$, $ReO_2$, $ReO_3$, $Re_2O_7$, iron oxides FeO, $Fe_2O_3$, $Fe_3O_4$, cobalt oxides CoO, $Co_3O_4$, nickel oxides NiO, $NiO_2$, ruthenium oxides $RuO_2$, $RuO_4$, rhodium oxides $Rh_2O_3$, $RhO_2$, palladium oxide PdO, osmium oxides $OsO_2$, $OsO_4$, iridium dioxide $IrO_2$, platinum oxide PtO. Metal oxides in their various forms, e.g., $\alpha$-$Fe_2O_3$, $\beta$-$Fe_2O_3 \cdot H_2O$, $\gamma$-$Fe_2O_3 \cdot H_2O$, hydrous or hydrated oxides, e.g., $Cr_2O_3 \cdot H_2O$, $Fe_2O_3 \cdot nH_2O$ (brown ore), $2Fe_2O_3 \cdot 3H_2O$ (limonite), $PdO_2 \cdot nH_2O$, $PtO_2 \cdot 4H_2O$ and various complex oxides, e.g., $FeTiO_3$ (ilmenite), $Fe_2O_3 \cdot 3TiO_2$ (Arizonite), $FeCr_2O_4$ (ferrous chromite) are also considered as examples of the metal oxides falling within the scope of this invention. Where hydrous or hydrated metal oxides are used for preparing catalysts by reaction with sulfuric acid, the water present in the reaction product may be removed, for instance, by drying under vacuum. It is preferred to use the oxides of the metals containing little or no water. Particularly preferred because of cost and availability are the oxides of aluminum ($Al_2O_3$), titanium ($TiO_2$), vanadium ($V_2O_5$), chromium ($Cr_2O_3$), manganese ($MnO_2$) and iron ($Fe_2O_3$).

In mixing the metal oxide with concentrated sulfuric acid, the molar ratio of oxide to acid may range from 50:1 to 1:10. Preferably this ratio should exist in the range between 20:1 and 1:6.

In the preparation of these catalysts, it has been found advantageous to employ reasonably pure materials in order to avoid the presence of excessive moisture or other deleterious impurities. With this exception, there is nothing especially critical about the preparation procedure which would not be well understood by a person skilled in the art. The catalytic activity may be modified by heat treating the catalyst mixture before adding the same to the monomer. Conventional heat-treating techniques would be employed, as for example, to maintain the catalyst mixture at about 60 to 100° C. for approximately one to four hours.

The amount of catalyst, defined as the total weight of the metal oxide and sulfuric acid, required in the polymerization of vinyl alkyl ethers is not especially critical in this invention. The useful range may vary from between 0.005 to 5.0 percent by weight of the catalyst based on the weight of the monomer. It has been found, however, that the preferred range is from 0.01 to 1.0 percent catalyst by weight based on the weight of the monomer.

The vinyl alkyl ethers which are homopolymerized or copolymerized to solid polymers by the method of this invention have the general formula $CH_2$=CHOA. In this formula, the constituent A represents an alkyl group containing up to about 10 carbon atoms. It may be linear, cyclic or branched. However, vinyl alkyl ethers having linear alkyl groups are generally preferred. It is to be understood that an alkenyl group or an aralkyl group is to be considered equivalent to an alkyl group in formulating vinyl ethers represented by the above formula

$$CH_2=CHOA$$

It is further understood that the alkyl, alkenyl or aralkyl groups contemplated might also contain non-reactive groups, as for example halogen, nitrile, ether and ester groups.

It should also be appreciated that the invention herein claimed would function in an equally advantageous manner were the vinyl group to contain a substituent such as a methyl radical thereby forming, for instance, propenyl or isopropenyl groups. The substituent might also be another vinyl radical, thus forming, for instance, butadienyl. Typical examples of the vinyl alkyl ethers yielding high molecular weight polymers which may be employed in the practice of this invention are vinyl methyl ether, vinyl ethyl ether, vinyl n-propyl ether, vinyl isopropyl ether, vinyl n-butyl ether, vinyl isobutyl ether, vinyl 2-ethylhexyl ether, vinyl cyclohexyl ether, vinyl benzyl ether, vinyl allyl ether, 1-vinyloxy-2-allyloxy ethane, vinyl 2-chloroethyl ether, vinyl 2-cyanoethyl ether, vinyl trifluoroethyl ether, propenyl methyl ether, isopropenyl ethyl ether, 1-methoxy-1,3-butadiene, 1-ethoxy-1,3-butadiene, 2-methoxy-1,3-butadiene, $\beta$-vinyloxyethyl methacrylate, and the like.

The preferred monomer species which may be utilized in practicing this invention are the vinyl alkyl ethers wherein the alkyl radical contains from 1 to 8 carbon atoms and may be linear or branched. The most preferred species are vinyl ethyl ether and vinyl n-butyl ether. In general polymers of these vinyl alkyl ethers may be obtained by polymerizing the vinyl alkyl ether in the presence of the aforementioned catalysts, either in solution or bulk.

Copolymers of a vinyl alkyl ether, for instance vinyl n-butyl ether with small amounts of vinyl 2-chloroethyl ether, vinyl allyl ether, 1-vinyloxy-2-allyloxy ethane, β-vinyloxyethyl methacrylate, 1-methoxy-1,3-butadiene or 2-methoxy-1,3-butadiene can be vulcanized by suitable compounding recipes well known in the art to yield useful elastomeric products.

The general procedure employed in solution polymerization is to dissolve the vinyl alkyl ethers in an inert solvent or diluent. Care should be exercised to exclude excessive moisture from the polymerization vessel, the monomers and the inert diluent. The required amount of catalyst is then introduced into the monomer/diluent mixture. Since the reaction is exothermic, some method of removing this exothermic heat of reaction is usually provided and the reaction vessel may be equipped with a stirring apparatus. When the reaction is completed, or the desired conversion obtained, the polymer formed is isolated and recovered by adding to the monomer/polymer/diluent mixture enough non-solvent for the polymer, for example a water-alcohol mixture, to precipitate the polymer from the mixture. Alternatively, the catalyst may be deactivated with a small amount of alcohol and the diluent and residual monomer removed by evaporation. The thus isolated polymer is dried according to normal practices well known in the art.

By the term, inert solvent or diluent is meant a solvent or diluent which does not adversely affect the polymerization process. It is a means of dissipating the heat of reaction. However, it is well known that, in carrying out polymerizations in the presence of solvents, the rate of polymer formation, the molecular weight of the polymer and the stereoregularity of the polymer may be greatly influenced by a judicious selection of the solvent and/or the temperature of polymerization.

Examples of inert solvents or diluents useful in the practice of this invention are paraffinic hydrocarbons such as pentane and hexane; aromatic hydrocarbons such as benzene; chlorinated aliphatic hydrocarbons such as dichloromethane, trichloroethylene; chlorinated aromatic hydrocarbons such as chlorobenzene; ethers such as diethyl ether, dibutyl ether and tetrahydrofuran; esters such as ethyl acetate and amyl acetate; ketones such as acetone and methyl ethyl ketone; nitrile compounds such as acetonitrile; nitro compounds such as nitroethane; and carbon disulfide. It has been observed that the solvent to monomer ratio useful in the solution polymerization of these polymers may vary from 0:1 to 20:1 and even higher. However, no apparent advantage is obtained in a ratio greater than 20:1. It is preferred to use a solvent to monomer ratio ranging from 0.5:1 to 10:1.

In bulk polymerizations of the vinyl alkyl ethers of this invention, the monomer is generally placed in a suitable reaction vessel and the required amount of catalyst added, exercising care to exclude excessive amounts of moisture. An immediate reaction ensues which is highly exothermic. Therefore, it is desirable to provide means to remove this exothermic heat of reaction. The polymer is recovered by the addition of a non-solvent for the polymer in a manner similar to that used in solution polymerizations. The polymer is washed and dried in a manner according to normal practice.

The reaction temperature is not critical and the reaction may be conducted within the temperature range from about $-100°$ C. to about $100°$ C. Reaction at room temperature has been found to be a satisfactory and convenient mode for conducting the polymerization. The inherent viscosities of the polymers were determined at $30°$ C. in benzene solvent containing 0.1 percent phenyl β-naphthylamine (PBNA) stabilizer. The concentration of the polymer was about 0.1 g. per dl. Inherent viscosity $(\eta)$ is defined as the natural logarithm of the relative viscosity divided by the concentration of polymer expressed in gms. per dl.

The practice of this invention is further illustrated by the following examples which are intended to be illustrative rather than restrictive of the practice and scope of the invention unless otherwise designated All parts are reported by weight and p.h.m. stands for weight parts per hundred of monomer.

EXAMPLES 1–8

Vinyl-n-butyl ether was washed with water, dried over potassium hydroxide pellets, then refluxed and distilled at least twice over sodium wire. n-heptane, benzene, and trichloroethylene were distilled over phosphorus pentoxide before use.

Into a clear, dry, 8-oz. bottle were added 7.85 grams (0.049 mol) $Fe_2O_3$, 100 cc. dry heptane and 8 dried porcelain balls. Under nitrogen, 0.62 cc. of 98% $H_2SO_4$ (0.0116 mol) was injected and the cap tightened. The bottle was rolled for 24 hours.

Two catalyst suspensions were prepared from alumina in a similar manner using dried mineral oil as the suspending medium.

All polymerizations were conducted in a nitrogen atmosphere under conditions shown in the following tables. The polymers were precipitated in excess methanol containing approximately 0.2 percent phenyl beta-naphthylamine and dried under aspirator vacuum.

TABLE I.—POLYMERIZATION OF VINYL n-BUTYL ETHER WITH $Fe_2O_3$ [a]-$H_2SO_4$ CATALYST (MOLAR RATIO 4:1 [b]).

[Order of addition: Monomer, solvent, catalyst 0.2 ml.]

| Example | Monomer, ml. | Solvent | Catalyst, phm. | Time, hrs. | Temp., °C. | Polymer Conversion, % | $(\eta)$ [c] dl./g. |
|---|---|---|---|---|---|---|---|
| 1 | 10 | (A) | 0.205 | 3 | 25 | 50 | 2.6 |
| 2 | 10 | (B) | 0.205 | 3 | 25 | 20 | 0.4 |
| 3 | 30 | None | 0.068 | 3 | 25 | 65 | 3.5 |
| 4 | 90 | do | 0.023 | 36 | −25 | 55 | 2.8 |

[a] General Chemical Co., Reagent Grade.
[b] 1 ml. suspension≡0.08 gram ferric oxide+sulfuric acid.
[c] Inherent Viscosity.
(A) 50 ml. heptane.
(B) 50 ml. trichloroethylene.

TABLE II.—POLYMERIZATION OF VINYL n-BUTYL ETHER WITH $Al_2O_3$-$H_2SO_4$ CATALYST

[Monomer 10 ml., solvent 50 ml., catalyst 0.2 ml., 50° C., 18 hours]

| Example | $Al_2O_3/H_2SO_4$ Molar Ratio (phm.) | Solvent | Polymer Conversion, Percent | $(\eta)$ dl./g. |
|---|---|---|---|---|
| 5 | 4:1 (0.15) [a] | Benzene | 85 | 2.7 |
| 6 | 6:1 (0.205) [b] | do | 69 | 2.9 |
| 7 | 4:1 (0.15) [a] | Heptane | 100 | 3.0 |
| 8 | 6:1 (0.205) [b] | do | 100 | 2.8 |

[a] 4.812 grams of $Al_2O_3$ (Baker and Adamson, Reagent Grade) plus 0.62 ml. conc. $H_2SO_4$ plus 100 ml. mineral oil. 1 ml. suspension ≡ 0.059 gram aluminum oxide plus sulfuric acid.
[b] 7.069 grams of $Al_2O_3$ plus 0.62 ml. conc. $H_2SO_4$ plus 100 ml. mineral oil. 1 ml. suspension ≡ 0.08 gram aluminum oxide plus sulfuric acid.

EXAMPLES 9 and 10

A mixture of 6.08 grams of $Cr_2O_3$ (0.04 mol), 100 ml. dry heptane and 0.53 ml. of 98% $H_2SO_4$ (0.01 mol) was rolled for 16 hours in a screw-capped 8-oz. bottle containing dried porcelain balls. The contents were then heated at 85° C. for 4 hours.

Another catalyst suspension was prepared similarly from 3.20 grams of $TiO_2$ (0.04 mol) and 0.53 ml. of 98% $H_2SO_4$ in 100 ml. heptane. The molar ratio of the metal oxide to sulfuric acid in the above catalyst suspension was 4:1. 0.05 ml. of the catalyst suspension was used to initiate polymerization of a mixture of 10 ml. of vinyl n-butyl ether and 50 ml. heptane at −50° C. After 4 hours, the polymerization mixture was treated with 350 ml. methanol containing 0.4 gram PBNA stabilizer. The data are shown below:

TABLE III

| Example | Catalyst | Polymer Yield, percent | $(\eta)$ dl./g. |
|---|---|---|---|
| 9 | $Cr_2O_3$-$H_2SO_4$ | 90 | 1.2 |
| 10 | $TiO_2$-$H_2SO_4$ | 97 | 1.1 |

EXAMPLES 11–15

The data in Table IV demonstrate that the catalysts prepared from $V_2O_5$ and from $MnO_2$ by interaction with sulfuric acid also exhibit catalytic activity for polymerizing vinyl alkyl ethers at 30° C. A mixture of 10 ml. of monomer (vinyl isobutyl ether) and 50 ml. of solvent (carbon disulfide) was used in each case. The reaction mixture was precipitated in 350 ml. methanol (0.1% PBNA).

TABLE IV

| Example | Catalyst | Amount, ml. | Polymerization time | Polymer Yield, percent | $(\eta)$ dl./g. |
|---|---|---|---|---|---|
| 11 | (A) | 0.15 | 18 | 62 | 1.4 |
| 12 | (B) | 0.15 | 18 | 25 | 1.4 |
| 13 | (B) | 0.05 | 18 | 29 | 3.7 |
| 14 | (A) | 0.05 | 18 | 19 | 1.1 |
| 15 | (C) | 0.50 | 4 | 30 | 1.0 |

(A) 3.60 grams of $V_2O_5$, 0.53 ml. of 98% $H_2SO_4$ and 50 ml. of mineral oil were rolled at 25° C. Molar ratio of $V_2O_5$ to $H_2SO_4$=2:1.
(B) 1.60 grams of $TiO_2$, 0.53 ml. of 98% $H_2SO_4$ and 50 ml. of mineral oil were rolled at 25° C. Molar ratio of $TiO_2$ to $H_2SO_4$=2:1.
(C) 1.75 grams of coarse $MnO_2$, 0.265 ml. of 98% $H_2SO_4$ and 50 ml. of mineral oil were rolled at 25° C. Molar ratio of $MnO_2$ to $H_2SO_4$ was 4:1.

At room temperature, the polymer of Example 12 contained 23 percent methyl ethyl ketone-insoluble fraction. A portion of this insoluble fraction was molded at 300° F. for 10 minutes. After standing overnight, the molded specimen in the unstretched condition gave a sharp X-ray diffraction pattern, indicating the methyl ethyl ketone-insoluble fraction was highly crystalline.

While certain representative embodiments and details have been shown for the purpose of illustrating the invention, it will be apparent to those skilled in this art that various changes and modifications may be made therein without departing from the spirit or scope of the invention.

What is claimed is:
1. The process of polymerizing a vinyl alkyl ether to form a high molecular weight polymer which comprises carrying out the polymerization in the presence of a catalytic amount of the reaction product of (1) concentrated $H_2SO_4$ and (2) the oxide of a polyvalent metal which is a member of the group consisting of the metals of group IIIa, IVb, Vb, VIb, VIIb and group VIII of the periodic table, and wherein the molar ratio of metal oxide to $H_2SO_4$ is between 50:1 and 1:10 and the polymerization temperature is between −100° C. and 100° C.

2. The process according to claim 1 wherein the molar ratio of metal oxide to sulfuric acid is between 20:1 and 1:6.

3. The process according to claim 2 wherein the oxide is of a polyvalent metal from group IIIa.

4. The process according to claim 2 wherein the oxide is of a polyvalent metal from group IVb.

5. The process according to claim 2 wherein the oxide is of a polyvalent metal from group Vb.

6. The process according to claim 2 wherein the oxide is of a polyvalent metal from group VIb.

7. The process according to claim 2 wherein the oxide is of a polyvalent metal from group VIIb.

8. The process according to claim 2 wherein the oxide is of a polyvalent metal from group VIII.

9. The process according to claim 3 wherein the metal oxide is $Al_2O_3$.

10. The process according to claim 4 wherein the metal oxide is $TiO_2$.

11. The process according to claim 5 wherein the metal oxide is $V_2O_5$.

12. The process according to claim 6 wherein the metal oxide is $Cr_2O_3$.

13. The process according to claim 7 wherein the metal oxide is $MnO_2$.

14. The process according to claim 8 wherein the metal oxide is $Fe_2O_3$.

15. The process according to claim 2 wherein the vinyl alkyl ether is selected from the group consisting of vinyl methyl ether, vinyl ethyl ether, vinyl n-butyl ether and vinyl isobutyl ether and the oxide of the polyvalent metal is selected from the group consisting of aluminum oxide, titanium dioxide, vanadium pentoxide, chromium trioxide, manganese dioxide and ferric oxide.

16. The process according to claim 15 wherein the polymerization is carried out in the presence of carbon disulfide.

References Cited

FOREIGN PATENTS 651,875  11/1962  Canada.

OTHER REFERENCES

Mellor: Comprehensive Treatise or Inorganic and Theoretical Chemistry, vol. 13, Fe (part 2), Longmans, Green and Co., New York, 1934, QD 31 M4, page 811 relied on.

JOSEPH L. SCHOFER, *Primary Examiner.*

M. B. KURTZMAN, *Assistant Examiner.*